United States Patent [19]

Nielsen

[11] Patent Number: 4,458,510
[45] Date of Patent: Jul. 10, 1984

[54] LOCKING DEVICE FOR A WINGED GAS STOP

[75] Inventor: Anker J. Nielsen, Holden, Mass.

[73] Assignee: OMCO Inc., Holden, Mass.

[21] Appl. No.: 400,433

[22] Filed: Jul. 21, 1982

Related U.S. Application Data

[63] Continuation-in-part of Ser. No. 216,296, Dec. 15, 1980, abandoned.

[51] Int. Cl.³ .................. E05B 67/38; B65D 55/14; F16C 3/00
[52] U.S. Cl. .................................. 70/212; 70/177; 70/108; 70/56
[58] Field of Search .................. 70/34, 54–56, 70/163–168, 175–180, 202, 210–212, 371, 440; 137/377, 382, 383, 384, 385; 292/327

[56] References Cited

U.S. PATENT DOCUMENTS

| 89,929 | 5/1869 | Hall | 70/180 |
|---|---|---|---|
| 2,666,318 | 1/1954 | Welch | 70/440 |
| 3,406,708 | 10/1968 | Maydock | 137/382 |
| 3,572,063 | 3/1971 | Foote | 70/440 |
| 3,714,802 | 2/1973 | Morse | 70/34 |
| 3,757,549 | 9/1973 | Mullis | 137/383 |
| 3,867,822 | 2/1975 | Morse | 70/164 |
| 4,008,585 | 2/1977 | Lundberg | 70/164 |
| 4,080,811 | 3/1978 | Nielsen | 70/164 |
| 4,120,182 | 10/1978 | Michelman | 70/417 |
| 4,158,953 | 6/1979 | Nielsen | 70/164 |
| 4,226,102 | 10/1980 | Mattress | 70/164 |
| 4,377,178 | 3/1983 | Thompson | 137/385 |

FOREIGN PATENT DOCUMENTS

| 122777 | 10/1927 | Switzerland | 70/371 |
|---|---|---|---|
| 474653 | 8/1969 | Switzerland | 70/34 |

Primary Examiner—Robert L. Wolfe
Attorney, Agent, or Firm—Irving M. Kriegsman

[57] ABSTRACT

A locking device to prevent unauthorized opening of a winged gas stop used to control the flow of gas to a residence from the lines of a utility company is disclosed. The device comprises a shroud which is shaped to fit snugly over the two wings of the gas stop when the gas stop is in a closed position and a barrel lock which is adapted to be inserted into the shroud and through holes in the wings to lock the wings in place and the shroud on the wings so that the wings cannot be moved relative to each other. The shroud includes a metal shell open at the bottom and at the rear, a thin metal sleeve, a metal locking plate and a metal end cap. The locking plate and end cap are both welded onto the rear of the shell and the sleeve is press fit into a hole in the front of the shell. The sleeve includes two sets of apertures near the outer end, one for use in attaching a lead wire tamper indicating seal and the other for use in attaching a tamper indicating seal, and a step along a midlocation for limiting the inward movement of the sleeve when it is inserted in the shell. The shell includes integrally formed reinforcing bars to prevent bending the shell away from the gas stop from the bottom or sides with a claw hammer or other hand tool after it is mounted thereon to gain access to the wings.

17 Claims, 16 Drawing Figures

LOCKING DEVICE FOR A WINGED GAS STOP

CROSS REFERENCE TO RELATED APPLICATIONS

This application is a continuation-in-part of U.S. patent application Ser. No. 216,296, filed on Dec. 15, 1980 and now abandoned, and assigned to the assignee of this application, which application is incorporated herein by reference.

BACKGROUND OF THE INVENTION

The present invention relates generally to locking devices and, more particularly, to a locking device for use in locking a winged gas stop in the closed or "off" position.

Gas stops, or gas cocks as they are sometimes called, are very well known in the art and commonly used by gas companies for coupling a gas line to a house or other type of building. Gas stops usually include (1) a main body having an inlet port which is adapted to be connected to the main gas line and an outlet port which is adapted to be connected to the line leading into the house, (2) a plug inside the main body which is movable to either an open position wherein the gas can flow, a closed position wherein the flow of gas is blocked or positions in between, and (3) a knob on one end of the plug for use in physically turning the plug from one position to another. In one form of gas stop known as a "winged" gas stop, the main body and the knob each include a winged shaped portion having a hole. When the gas stop is in a closed position, the two wings and their respective holes are in alignment. The gas stop may be locked in that position when so desired by inserting some form of locking device through the two holes so that the wings cannot be moved relative to each other.

One form of locking device which has been used with winged gas stops comprises a barrel lock and an end cap. In using this type of locking device, the shank of the barrel lock is inserted through the two holes in the wings and locked on to the end cap which is positioned on the opposite side of the wings from which the barrel lock is inserted. The head of the barrel lock usually includes a small transverse circular hole which extends through the keyhole of the barrel and into which can be mounted a lead wire tamper indicating seal. Once mounted, if a key or other object is inserted into the keyhole the seal will be broken. One disadvantage of this type of locking device is that it can be tampered with without actually disturbing the seal on the head. Another disadvantage of this type of locking device is that it cannot be used with a bayonet type tamper indicating seal since this type of seal requires rectangular slots rather than a circular hole for mounting purposes.

Another form of locking device which has been used with winged gas stops comprises a shroud and a barrel lock. The shroud includes a metal shell which is shaped to fit over the two wings when the two wings are in alignment with each other. The shell is provided with a hole at the front end through which the barrel lock may be inserted and a locking member at the rear end onto which the tip of barrel lock containing the locking elements is brought into engagement with and then locked in place. Although the shroud covers the entire front end (i.e. shank) portion of the barrel lock and thus prevents tampering with the front end of the barrel lock, the device still suffers from the limitation that it is only useful with a lead wire type tamper indicating seal. Also, the head of the barrel lock is exposed and subject to attack. In order to overcome these disadvantages, shrouds have been constructed which include a sleeve at the front end into which the barrel lock is inserted. The sleeve includes apertures for use in mounting a bayonet type tamper indicating seal and at the same time encloses or covers the head of the barrel lock. In one version of such a device, the sleeve is integrally formed on the front of the shell. The disadvantage of this construction is that it is too costly to fabricate. In another version of such a device, the sleeve is formed as a separate element from flat stock and is resistance welded to the shell. After the sleeve attached, the unit is case hardened for strengthening purposes. One problem with this arrangement is that it is rather difficult to weld the sleeve to the shell in a satisfactory manner. Another problem with this arrangment is that the sleeve becomes rather brittle after the case hardening process and as a result is subject to breaking or being easily snapped off even before the device is actually used. Still another approach has involved forming a sleeve by boring a hole in a solid metal rod, forming seal receiving apertures in the rod and then attaching the rod to the front end of the shell by conventional welding. The disadvantages of this approach are that the apertures maust be formed by milling which is expensive, the cost in making the sleeve from solid bar stock is expensive and the welding operation itself is expensive.

Accordingly, the need exists for a new locking device of the type comprising a shroud having a sleeve containing apertures for mounting either a bayonet or lead wire type tamper indicating seal for use with a barrel lock in locking a winged gas stop in the closed position.

PRIOR ART CITED IN PARENT PATENT APPLICATION

U.S. Pat. No. 89,924, to U. T. Hall discloses a gas stop which includes a projecting collar on the cock proper, a projecting collar on a shell which is movable relative to the cock proper, a hole on each collar and a padlock which may be inserted through the two holes to prevent relative movement of the two collars. U.S. Pat. No. 2,666,318, to N. A. Welch discloses a padlock which includes a slot through which may be inserted a ribbon-like frangible tamper indicating seal. U.S. Pat. No. 3,406,708, to E. J. Maydock discloses a locking attachment for a winged gas or water valve which includes a shroud and a barrel lock. U.S. Pat. No. 3,572,063, to D. J. Foote discloses a lock which includes different tamper indicating seal retaining means for holding different types of tamper indicating seals.

U.S. Pat. No. 3,867,822 to L. H. Morse et al discloses a locking device for an electric meter, the device including a yoke and a bolt type lock. U.S. Pat. No. 3,714,802, to L. H. Morse shows a locking bolt for shut-off valves and switches which includes a transverse bore for the receival of a tamper indicating seal. U.S. Pat. No. 3,757,549, discloses a locking device for an outboard motor clamp. U.S. Pat. No. 4,008,585, to Lundberg discloses a locking cover for a metal clamping ring which includes a collar which is securely attached to a bracket assembly welded inside a housing and barrel lock, the collar including a slot for receiving a tamper indicating seal. U.S. Pat. No. 4,158,953, to A. J. Nielsen, Jr. discloses a lock for an electric meter which includes a locking ring, a yoke, a collar and a barrel lock.

In U.S. Pat. No. 4,080,811, to A. J. Nielsen, Jr. there is disclosed a locking device for an electric meter which comprises a clamp holding the box lid shut, the clamp being locked in place overhanging the lid by a bolt through a bracket fixed on the box wall and a bolt type lock passed through registering holes in the clamp and bracket. All parts except the overhanging and adjacent portion or the clamp and a small portion of the lock are shielded from tampering by an enclosing yoke locked in place by the lock. U.S. Pat. No. 4,226,102 to A. Mattress, Jr. discloses a meter lock including a band for embracing and holding together a meter flange and a corresponding flange on a meter box, the lock including a housing for holding and locking together the ends of the band with a disengagement taking place only by removal of a locking pin. Swiss Patent No. 474,653, shows a bracket assembly having a sleeve for receiving a barrel lock and Swiss Patent No. 122,777 discloses a barrel lock and sleeve combination.

SUMMARY OF THE INVENTION

It is an object of this invention to provide a new and improved locking device for a gas stop.

It is another object of this invention to provide a new and improved locking device for a winged gas stop.

It is still another object of this invention to provide a new and improved locking device of the type including a shroud and a barrel lock for use with a winged gas stop.

It is a further object of this invention to provide an improved shroud for use with a barrel lock in locking a winged gas stop in a closed position.

It is still a further object of this invention to provide a locking device for a winged gas stop which can be used with either a lead wire type tamper indicating seal or a bayonet type tamper indicating seal.

It is yet still another object of this invention to provide a locking device for a winged gas stop which includes a barrel lock and a shroud having a barrel lock receiving sleeve, and wherein the sleeve is not integrally formed on the shroud, is not formed from solid bar stock and is not welded onto the body of the shroud.

It is another object of this invention to provide a locking device of the type referred to above which is extremely reliable, which is easy and economical to manufacture and which includes a minimum number of parts.

It is still another object of this invention to provide a locking device of the type described above which can be easily and conveniently installed and/or removed by an authorized person but which is extremely difficult to either remove or bend away from the gas stop once it is mounted thereon to access the wings by an unauthorized person.

It is a further object of this invention to provide a new and improved method of assembling a locking device of the type including a shroud having a shell and a barrel lock receiving sleeve.

It is a further object of this invention to provide a locking device of the type referred to above which is constructed so as to make it extremely difficult to tamper with the barrel lock after it has been inserted and locked in place or the wings of the gas stop without leaving an indication thereof.

A locking device constructed according to the teachings of the present invention comprises a shroud and a barrel lock. The shroud includes a metal shell which is adapted to fit snugly over the wings of the gas stop when the gas stop is in a closed position, a metal sleeve press fit into a hole in the front of the shell and a covered metal locking device welded on to the rear of the shell for engaging the locking elements in the shank of the barrel lock. In one embodiment of the invention, the shell includes integrally formed reinforcing bars to prevent bending of the shell body and the sleeve includes apertures for use in mounting a tamper indicating seal and a step along its length for limiting inward movement in the shell. In assemblying the shroud, the covered locking device is first welded onto the shell. The unit is then case hardened. The sleeve is then inserted into the shell and pushed inward until the step abuts the front of the shell body.

The foregoing and other objects and advantages will appear from the description to follow. In the description, reference is made to the accompanying drawings which form a part thereof, and in which is shown, by way of illustration specifice embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF PREFERRED EMBODIMENT

The present invention relates to a locking device for use in locking a winged gas stop in the closed or "off" position.

Figure 1:
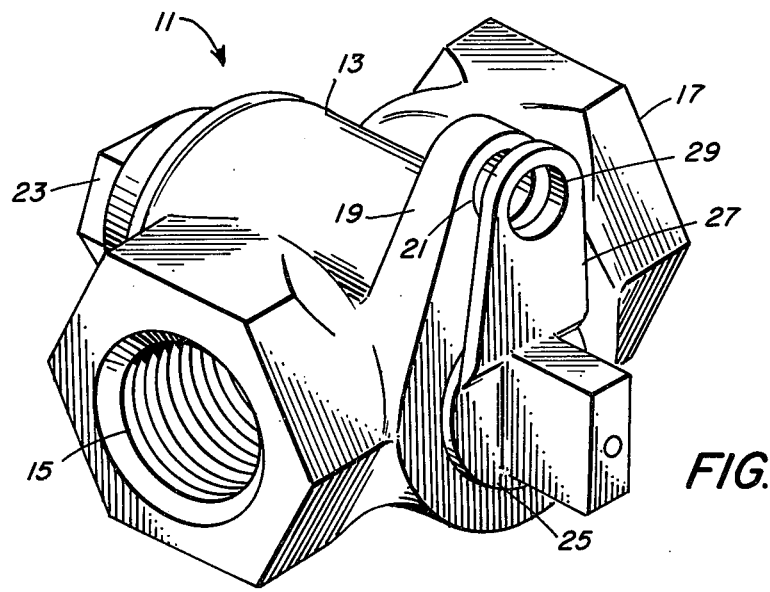
FIG. 1 is a perspective view of a winged gas stop.

Referring now to the drawings, there is shown in FIG. 1 a perspective view of a winged gas stop which is identified generally by reference numeral 11. Winged gas stop 11 includes a main body 13 having an inlet port 15, an outlet port 17 and a winged portion 19, the winged portion 19 having a hole 21. A rotatable plug (not shown) is located inside main body 23 and is in engagement with a female receptacle 23 on the back of main body 13. A knob 25 is attached to the front end of the plug. Knob 25 includes an integrally formed winged portion 27 having a hole 29. Main body 13 is made of fine grain cast iron while the plug and knob 25 are made of bronze. When wing 27 on knob 25 is aligned with wing 19 of main body 13 the holes on the respective wings are in alignment and the plug is in a closed position. When knob 25 is turned 90°, the plug is in an open position.

Figure 2:
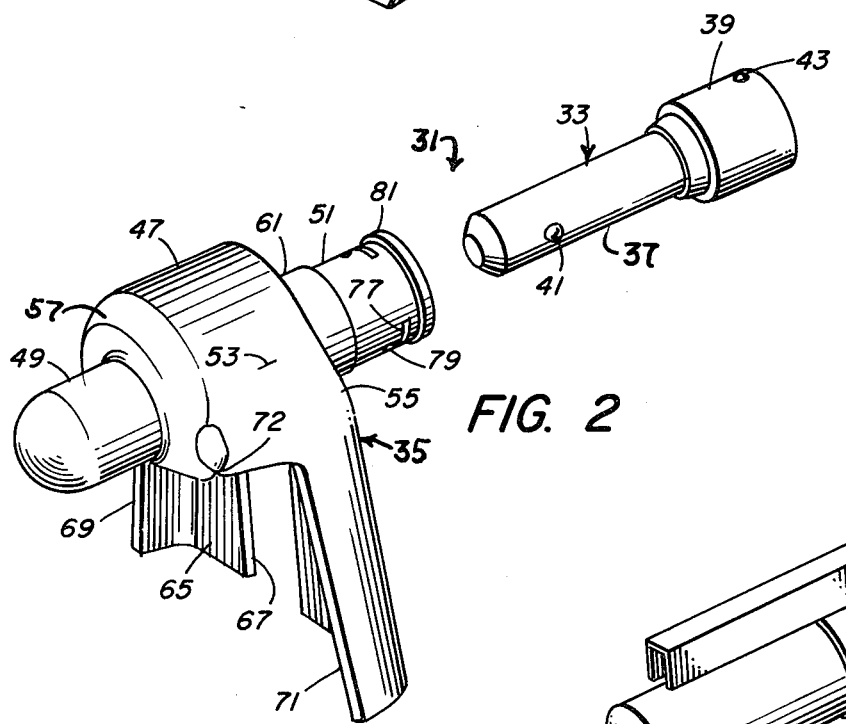
FIG. 2 is a perspective view taken from the rear end partically exploded of the parts of an embodiment of a locking device constructed according to the teachings of this invention.

Referring now to FIG. 2, there is shown an exploded perspective view of an embodiment of a locking device constructed according to the teachings of this invention and identified generally by reference numeral 31. Locking device 31 includes a barrel lock 33 and a shroud 35.

Figure 3:
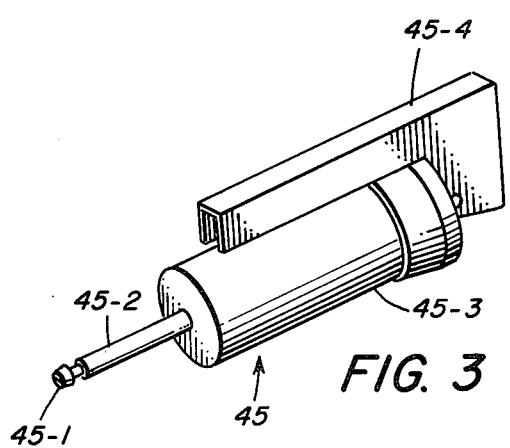
FIG. 3 is a perspective view of a key for use with the barrel lock shown in FIG. 2.

Barrel lock 33 includes a shank 37 and a head 39, head 39 being of a greater cross-sectional diameter than shank 37. Shank 37 includes a pair of diametrically opposed locking elements 41 (balls). Head 39 includes a small transverse bore 43, extending from one side to the other side through which may be inserted the wire portion of a lead wire type tamper indicating seal. Barrel lock 33 further includes an axial bore (not shown) in the head 39 which extends into shank 37 and through which may be inserted a key 45, such as shown in FIG. 3, for opening and closing locking elements 41, (i.e. moving locking elements 41 from a protruded to a relaxed position). As can be seen, key 45 includes a plunger 45-1 slidably mounted on a tube 45-2 which is mounted in an casing 45-3 and a handle 45-4. Barrel lock 33 and key 45 may be a combination such as disclosed in U.S. Pat. No. 4,058,992, which patent is incorporated herein by reference.

Figure 4:
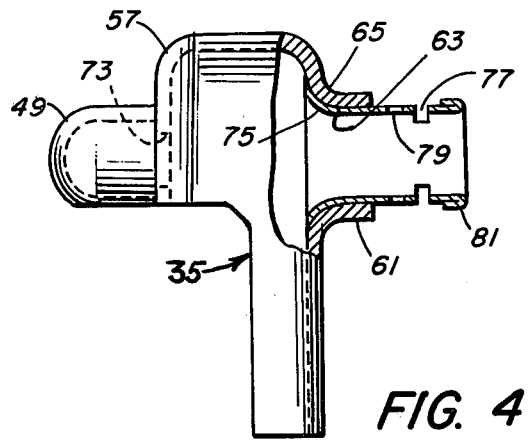
FIG. 4 is a side view partly in section of the shroud shown in FIG. 2.
Figure 5:
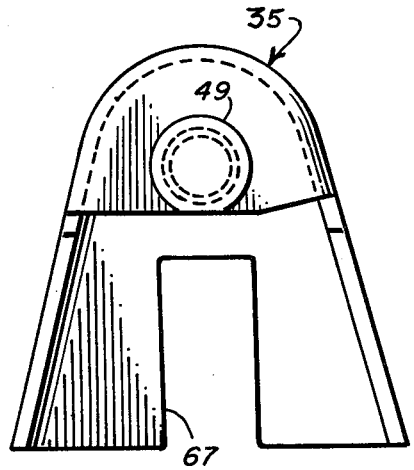
FIGS. 5 and 6 are rear and front end views respectively, of the shroud shown in FIG. 4.
Figure 6:
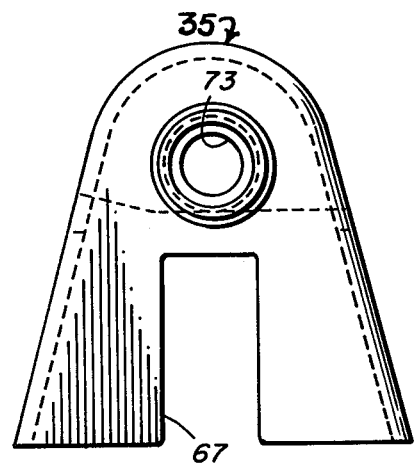
Figure 7:
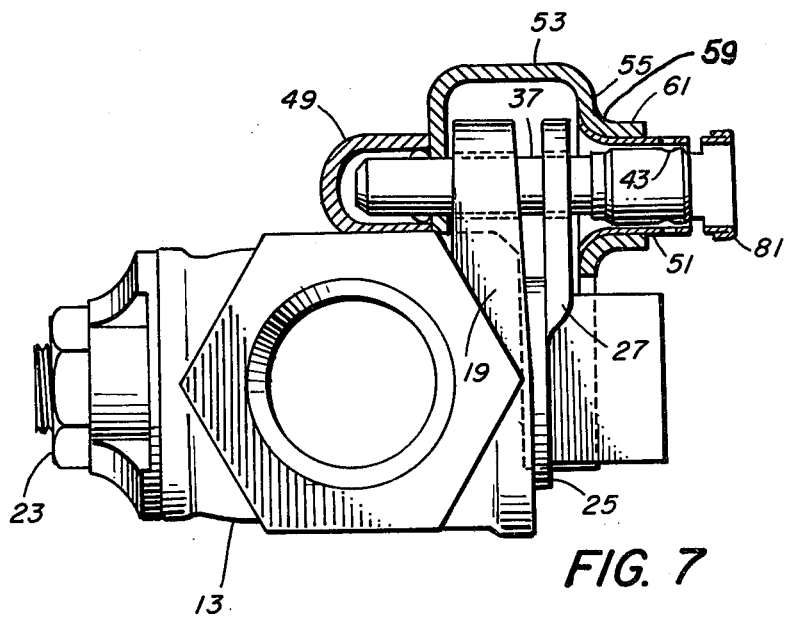
FIG. 7 is an side view, partly in section, of the locking device of FIG. 2 mounted on the winged gas stop shown in FIG. 1.

Shroud 35, which is also shown in a side view in FIG. 4, in rear and front end view in FIGS. 5 and 6, respectively, and in section view along with gas stop 11 in FIG. 7 includes a shell 47, an end cap 49 and a sleeve 51.

Shell 47 is made by a stamping from a sheet of metal such as case hardened steel having a thickness of about 0.093 inches and includes a curved side wall 53 which is sized and shaped to fit over wings 19 and 27 on gas stop 11, a front wall 55 and a rear wall 57.

Front wall 55 includes a top portion 59 containing a boss 61. Boss 61 is provided with a hole 63 which is located so as to be in alignment with holes 21 and 29 on wings 19 and 27 when the shell 44 is mounted on wings 19 and 27. Front wall 55 also includes a bottom portion 65 having a rectangular slot 67 extending up from the bottom edge and sized so that lower portion 65 extends down on either side of knob 25. The lower portions 69 and 71 of curved side wall 53 cover the sides of wings 19 and 27. Hole 63 is sized larger than the cross sectional diameter of head 39 of barrel lock 33. Rear wall 57 is welded at lower corners 72 to the top portion of side wall 53 and is provided with a hole 73 which is aligned with hole 63 in front end wall 55 and which is sized to allow shank 37 of barrel lock to pass through when locking elements 41 are in their relaxed position but not when they are in a protruded position.

Sleeve 51 is tubular in cross-section, is made by a stamping from a sheet of metal such as steel, and has a thickness of around 0.012 inches. Sleeve 51 is slip-fit into hole 63 and then flared out at its inner end 75 after insertion into hole 63 to prevent withdrawal. The flaring of inner end 75 may be achieved utilizing any known machine shop technique, such as by using an expandable urethane plug. Sleeve 51 is provided with a pair of diameterically opposed slots 77 near its outer end for use in mounting a bayonet type tamper indicating seal and a pair of diametrically opposed holes 79 also near its outer end for use in mounting a lead wire type tamper indicating seal. The length of sleeve 51 is such that when it is mounted in hole 63 and barrel lock 33 is inserted therein, slots 77 are located outward beyond the head 39 of barrel lock 33 as shown in FIG. 7. Holes 79 are located along the length of sleeve 51 so as to be in alignment with hole 43 in head 39 of barrel lock 33. The outer end of sleeve 51 is bent back to form a lip 81 for increasing the strength at that end.

End cap 49 is tubular in cross section, closed at one end and is made from a metal such as steel. The wall thickness of end cap 49 is about ⅛ of an inch. End cap 49 is projection welded on to rear end wall 57 in alignment with hole 73. The inside diameter of end cap 49 is sized to accommodate shank 37 of barrel lock 33 when its locking elements are in their protruded position.

Shell 47, end cap 49 and sleeve 51 are preferably finished with a plating of cadmium deposit and yellow chromate to protect the unit against rusting etc.

Figure 8:
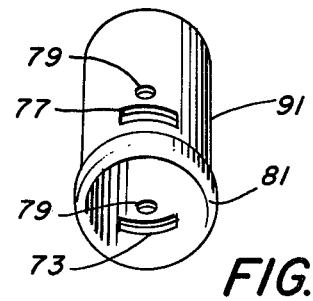
FIG. 8 is a perspective view of the sleeve portion of the shroud shown in FIG. 2 as it appears before it is inserted into the shell and fixed in place.

Sleeve 51 is made by forming a tubular member 91 having the appropriate diameter and then forming the holes 79, the slots 77 and the lip 81, as shown in FIG. 8. Tubular member 91 is then ready to be inserted into hole 63. After it is has been inserted, the inner end is flared out as shown.

Shroud 35 is assembled and treated in the following manner. First, end cap 49 is welded onto shell 47. Then, the unit is case hardened. Then, sleeve 51 is inserted into hole 63 and flared out at its inner end. Instead of being slip fit in hole 63, sleeve 51 may be press fit in hole 63 and the flaring out omitted. Then the entire unit is plated with a cadmium deposit and yellow chromate. As should be noted, sleeve 51 is not case hardened, since if it were, it would become rather brittle and because of its thickness be subject to breaking or being easily severed.

Locking device 31 is mounted and then locked on winged gas stop 11 in the following manner. First, shroud 35 is placed over wings 19 and 27. Then, barrel lock 33 is inserted through sleeve 51, through holes 21 and 29, through hole 73 and then locked in place. Locking device 31 as so mounted is shown in FIG. 7.

After the locking device 31 is mounted on the winged gas stop 11, a tamper indicating seal for indicating if the head of the barrel lock has been tampered with is attached to sleeve 51. If the tampering indicating seal is a bayonet type seal, then it is inserted through slots 77. On the other hand, if the seal is a lead wire type seal which comprises a braided length of wire and a piece of lead then it is inserted through holes 43 and 79. As can be appreciated, sleeve 51 can accommodate either type of seal.

Figure 9:
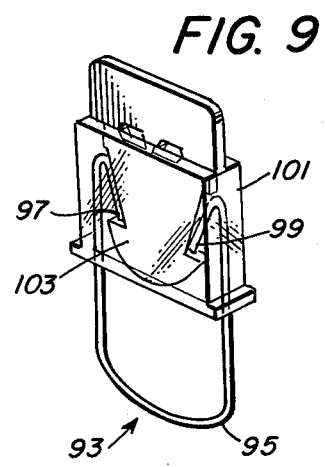
FIG. 9 is a perspective view of a bayonet type tamper indicating seal for use with the locking device of the invention.

The construction of a bayonet type tamper indicating seal is shown in FIG. 9. As can be seen, seal 93 includes a looped stainless steel length of wire 95 having bayonet shaped ends 97 and 99, a transparent plastic receptacle 101 and a plastic retaining member 103.

Figure 10:
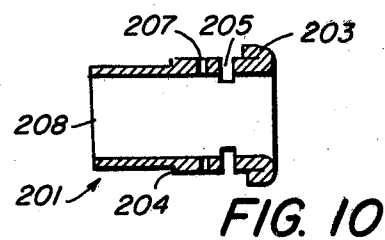
FIG. 10 is a side section view of a modified version of the sleeve portion of the shroud, as it appears before it is inserted into the shell and fixed in place.
Figure 12:
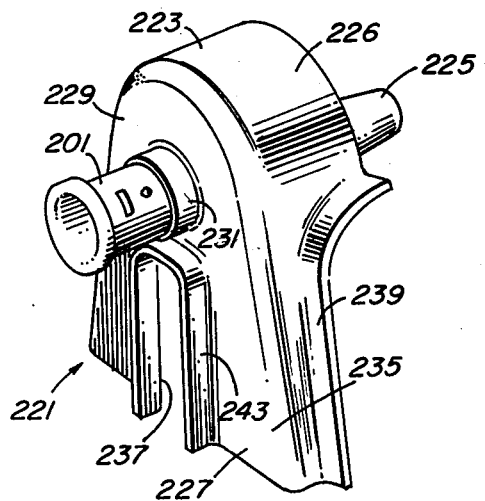
FIG. 12 is a perspective view taken from the front of another embodiment of the shroud portion of the locking device of the present invention including the sleeve shown in FIG. 10.
Figure 13:
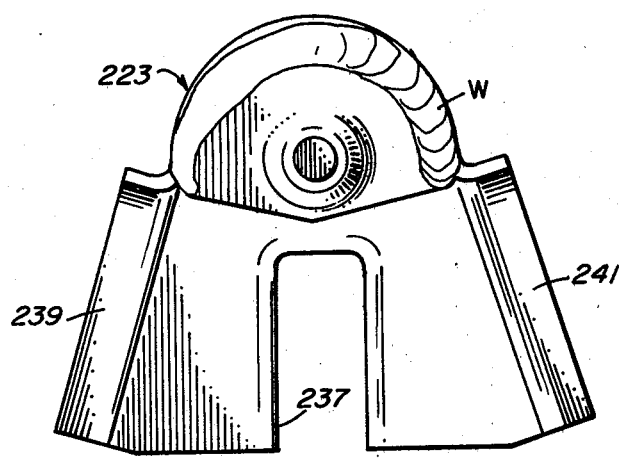
FIG. 13 is a rear view of the shroud shown in FIG. 12.
Figure 14:
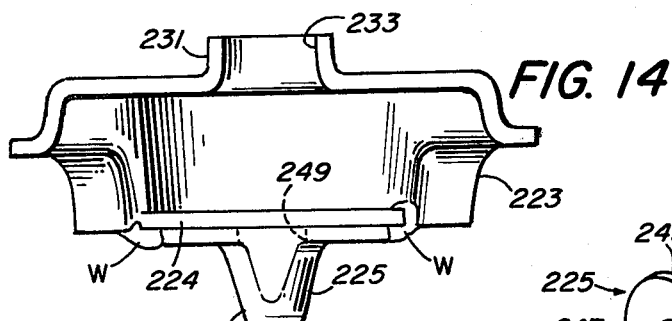
FIG. 14 is a bottom view of the shroud shown in FIG. 12 with the sleeve removed.
Figure 15:
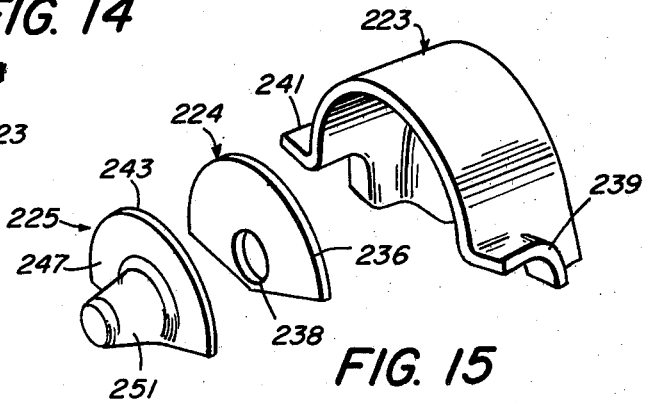
FIG. 15 is an exploded perspective view of the top portion of the shell, the locking plate and the end cap of the shroud shown in FIG. 12.
Figure 16:
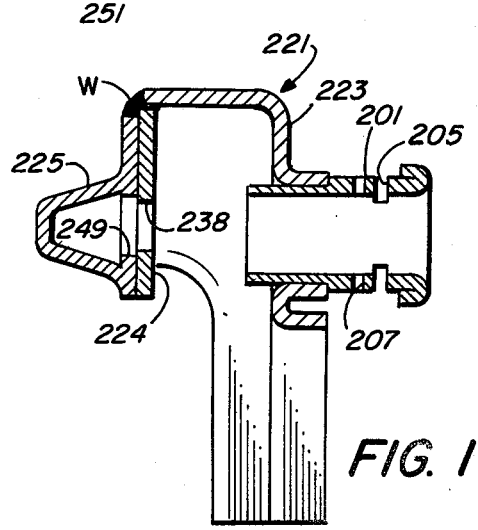
FIG. 16 is a side section view taken from the left of the shroud shown in FIG. 10.

Referring now to FIG. 10 there is illustrated a side section view of another embodiment of the sleeve portion of the shroud and identified by reference numeral 201. Sleeve 201 is tubular in cross-section, is made from a stamping, has a wall thickness of about 0.012 inches, and has a lip 203 at the front end for increasing the strength at that end and a step 204 at a location along the length of the side wall for limiting the inward movement when it is inserted in hole 63. Sleeve 201 also includes slots 205 for use mounting a bayonet type seal and holes 207 for use in mounting a wire type seal. If sleeve 201 is slip fit in hole 63, the inner end 208 is flared out in the same manner as sleeve 51 to prevent withdrawal. If sleeve 201 is press fit in hole 63, the flaring out may be omitted. When sleeve 201 is inserted in hole 63, the step 204 abuts against the front surface of boss 61.

Figure 11:
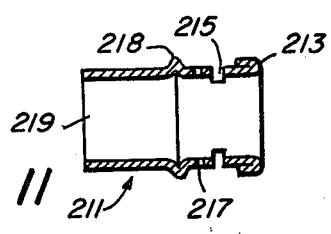
FIG. 11 is a side section view of another modified version of the sleeve portion of the shroud, as it appears before it is inserted into the shell and fixed in place.

Referring now to FIG. 11 there is illustrated a side section view of another embodiment of the sleeve portion of the shroud and identified by reference numeral 211. Sleeve 211 is made from a stamping and has a wall thickness of 0.012 inches. Sleeve 211 is similar to sleeve 201 and as such includes a lip 213 at the front and slots 215 and holes 217 which correspond to slots 205 and 207, respectively, in sleeve 20 with the difference being that the sidewall includes a bulge 218 rather than a step for limiting inward movement when it is inserted into hole 63. After sleeve 211 is inserted in hole 63, the inner end 219 is either flared out or left as is, depending on the type of fit.

Referring now to FIGS. 12 through 15 there is illustrated another embodiment of the shroud portion of the locking device constructed according to the teachings of the present invention and identified by reference numeral 221.

Shroud 221 includes a shell 223, a lock engaging plate 224, an end cap 225 and a sleeve 201.

Shell 223 is made by a stamping from a sheet of metal, such as steel, having a thickness of about 0.125 inches and includes a curved side wall 226 which is sized and shaped to fit over wings 19 and 27 on gas stop 11 and front wall 227. Front wall 227 includes a top portion 229 containing a boss 231 having a hole 233 which aligns with holes 21 and 29 on wings 19 and 27 when the shell is mounted thereon and a bottom portion 235 having a rectangular slot 237 which extend up from the bottom so that the bottom portion 235 can extend down on either side of knob 25 on gas stop 11. The bottom portion 235 of side wall 226 covers the sides of wings 19 and 27 and is bent outward at the back edge to form reinforcing bars 239 and 241. The edges of slot 237 are also bent outward to form a reinforcing bar 243. As can be appreciated, because of reinforcing bars 239, 241 and 243 it is extremely, if at all possible, to bend or pry the shell upward from the side or front with a crow bar or other hand tool to expose and then attack the wings, and in particular, the wing 27 attached to knob 25. Lock engaging plate 224 is made by a stamping from a sheet of metal, such as steel, having a thickness of about 0.125 inches and includes a curved top edge 236 and a hole 238. Hole 238 is sized so that the shank of the barrel lock can pass through when the balls are in a relaxed position but cannot pass through when the balls are in a protruded position. The radius of edge 236 is slightly less than radius of curved side wall 226.

End cap 225 is made of metal such as steel having a thickness of around 0.125 inches and includes a base portion 247 having a hole 249 and hollow cover 251 extending outward from hole 249. Hole 249 is sized to accommodate the shank of the barrel lock when the balls are in either a relaxed or protruded position. Base portion 247 includes a curved top edge 243 whose radius is slightly less than that of edge 235.

Lock engaging plate 224 and end cap 225 are welded onto shell 223, the welded areas being identified by the letter W. Lock engaging plate 224, end cap 225 and shell 223 are case hardened and coated with a cadmium deposit and yellow chromate (not shown). Sleeve 201 is not case hardened since if it were it would be very brittle and subject to be easily broken; but it is coated with a cadmium deposit and yellow chromate.

Shroud 221 is assembled and treated as follows. First, plate 224 and end cap 225 are welded onto shell 221 in a single welding operation. The unit is then case hardened. Then, sleeve 201 is press-fit into hole 233. Alternately sleeve 201 may be slip fit and then flared out at inner end 208. Then the entire unit is coated with a cadmium deposit and yellow chromate.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A locking device for use with a winged gas stop, the winged gas stop including a body having a wing, a plug turnable in said body, a knob fixedly attached to said plug and having a wing, each wing having a hole, the two wings and their respective holes being aligned when the plug is in a closed position the locking device comprising:
   a. a shroud, the shroud comprising:
      i. a metal shell sized and shaped to fit over the two wings on the gas stop when the two wings are aligned, said shell including reinforcing means for strengthening purposes and having a generally flat front wall having a hole located so as to be in axial alignment with the holes in the wings of the gas stop when the shell is mounted thereon and a generally curved side wall and an open rear,
      ii. a metal sleeve disposed in the hole in the front end of the shell, said metal sleeve having aperatures for use in mounting either a lead wire or a bayonet type tamper indicating seal,
      iii. covered lock engaging means on the rear of the shell for engaging a locking element on a barrel lock and preventing access to the locking element from the rear, and
   b. a barrel lock adapted to be inserted into the shroud through the sleeve, the holes in the wings on the gas stop wing and brought into locking engagement with the lock engaging means.

2. The locking device of claim 1 and wherein said sleeve is press fit in said hole in the front end of the shell.

3. The locking device of claim 1 and wherein said sleeve is slip fit in said hole in the front end of the shell and flared out at its inner end to prevent withdrawal.

4. A locking device for use with a winged gas stop, the winged gas stop including a body having a wing, a plug turnable in said body, a knob fixedly attached to said plug and having a wing, each wing having a hole, the two wings and their respective holes being aligned when the plug is in a closed position the locking device comprising:
 a. a shroud, the shroud comprising:
  i. a metal shell sized and shaped to fit over the two wings on the gas stop when the two wings are aligned, said shell including reinforcing means for strengthening purposes and having a front wall having a hole located so as to be in axial alignment with the holes in the wings of the gas stop when the shell is mounted thereon and side wall, the side wall of the shell including a lower portion having a back edge the reinforcing means comprising a flange on the back edge of the lower portion of the side wall,
  ii. a metal sleeve disposed in the hole in the front end of the shell, said metal sleeve having apertures for use in mounting either a lead wire or a bayonet type tamper indicating seal,
  iii. covered lock engaging means on the rear of the shell for engaging a locking element on a barrel lock, and
 b. a barrel locking adapted to be inserted into the shroud through the sleeve, the holes in the wings on the gas stop wing and brought into locking engagement with the lock engaging means.

5. The locking device of claim 4 and wherein the front wall includes a lower portion having a rectangular slot sized and shaped so that the lower portion extends down on either side of the knob on the gas stop.

6. The locking device of claim 5 and wherein the reinforcing means further includes a flange on the edge of the slot.

7. The locking device of claim 6 and wherein the covered lock engaging means comprises a metal locking plate and a metal protective cap.

8. The locking device of claim 7 and wherein the metal locking plate and the metal protective cap are both welded onto the side wall of the shell.

9. The locking device of claim 8 and wherein the sleeve includes integrally formed means along its length for limiting inward movement within the shell.

10. The locking device of claim 9 and wherein the apertures on the sleeve include a pair of holes for use with a lead wire type seal and a pair of slots for use with a bayonet type seal.

11. The locking device of claim 8 and wherein the shell and the lock engaging means are case hardened and the sleeve is not case hardened.

12. The locking device of claim 11 and wherein the shell has a wall thickness of about 0.125 inches and the sleeve has a wall thickness of about 0.012 inches.

13. The locking device of claim 12 and wherein the shell is made from a stamping.

14. The locking device of claim 1 and wherein the covered lock engaging means comprises a back wall on the shell having a hole and an end cap welded onto the back wall.

15. The locking device of claim 9 and wherein the sleeve includes an outer edge, the sleeve having a strengthening lip at its outer edge.

16. A locking device for use with a winged gas stop, the winged gas stop including a body having a wing, a plug turnable in said body, a knob fixedly attached to said plug and having a wing, each wing having a hole, the two wings and their respective holes being aligned when the plug is in a closed position, the locking device comprising:
 a. A shroud sized and shaped to fit over the wings on the gas stop when the wings are aligned with one another, the shroud including:
  (i) a case hardened metal shell having a wall thickness of about 0.125 inches and including a side wall and a front wall, the front wall having a top portion containing a hole and a bottom portion having a slot sized and shaped so that the bottom portion extends down on either side of the knob on the gas stop, the front wall further including integrally formed reinforcing bars for strengthening purposes,
  (ii) a case hardened metal covered lock engaging assembly welded onto the rear of the shell and including a locking plate having a hole and an end cap,
  (iii) a metal sleeve having a wall thickness of about 0.012 inches press fit into the hole in the top portion of the front wall of the shell, a step along its length to limit inward movement and a lip at the front end for strengthening purposes, and
  (iv) a barrel lock adapted to be inserted into the shroud through the sleeve, the holes in the wings on the gas stop wing and brought into locking engagement with the lock engaging means.

17. The locking device of claim 16 and wherein the shoud is fabricated by a method comprising:
 a. welding the shell and lock engaging assembly together, then
 b. case hardening the assembled shell and lock engaging assembly, and then
 c. press fitting the sleeve into the shell.

* * * * *